(12) United States Patent
Cheon et al.

(10) Patent No.: US 11,827,242 B2
(45) Date of Patent: Nov. 28, 2023

(54) AUTONOMOUS VEHICLE, AND METHOD FOR RESPONDING TO DRUNK DRIVING THEREOF

(71) Applicants: Hyundai Motor Company, Seoul (KR); Kia Corporation, Seoul (KR)

(72) Inventors: Seo Hyung Cheon, Seongnam-Si (KR); Eun Young Choi, Seoul (KR); Woo Jin Kim, Incheon (KR); Rosali Sun Pyun, Seongnam-Si (KR); Ki Seok Seong, Cheonan-Si (KR); Dong Il Yang, Seoul (KR); Min Sang Yu, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/855,160

(22) Filed: Jun. 30, 2022

(65) Prior Publication Data
US 2023/0182777 A1    Jun. 15, 2023

(30) Foreign Application Priority Data

Dec. 13, 2021  (KR) ........................ 10-2021-0178098

(51) Int. Cl.
*B60W 60/00* (2020.01)
*B60W 40/08* (2012.01)
*B60W 50/14* (2020.01)
*B60Q 9/00* (2006.01)
*H04W 4/90* (2018.01)
*H04W 4/40* (2018.01)

(52) U.S. Cl.
CPC .......... *B60W 60/0016* (2020.02); *B60Q 9/00* (2013.01); *B60W 40/08* (2013.01); *B60W 50/14* (2013.01); *H04W 4/40* (2018.02); *H04W 4/90* (2018.02); *B60W 2040/0836* (2013.01); *B60W 2050/146* (2013.01); *B60W 2540/24* (2013.01); *B60W 2556/45* (2020.02)

(58) Field of Classification Search
None
See application file for complete search history.

(56) References Cited

U.S. PATENT DOCUMENTS

2015/0149021 A1* 5/2015 Duncan ................. B60W 30/16
                                                            701/23
2017/0330044 A1* 11/2017 Telpaz ................. G05D 1/0088

* cited by examiner

*Primary Examiner* — Thomas S McCormack
(74) *Attorney, Agent, or Firm* — MORGAN, LEWIS & BOCKIUS LLP

(57) ABSTRACT

An autonomous vehicle and a drunk driving responding method, includes an autonomous driving control apparatus including a processor that is configured to determine whether the vehicle is in an emergency situation when the alcohol is detected in the vehicle, and to move the vehicle to an operational design domain when the processor concludes that the vehicle is in the emergency situation, and a communication device that is configured to notify a government office or a rescue organization of the emergency situation.

18 Claims, 4 Drawing Sheets

| Level 0<br>Non-automation |    | Hands On | · Driver always drives<br>· Emergency system assistance |
|---|---|---|---|
| Level 1<br>Driver assistance |    | Hands On | · System performs steering or deceleration/acceleration assistance |
| Level 2<br>Partial automation |    | Hands Off | · System performs steering or deceleration/acceleration |
| Level 3<br>Conditional automation |    | Eyes Off | · Driver intervenes in case of danger |
| Level 4<br>Advanced automation |    | Mind Off | · Driver intervention is unnecessary |
| Level 5<br>Full automation |    | Driver On | · No driver is required |

● Performed by driver
◉ Performed by driver conditionally
○ Performed by system

FIG.2

AUTONOMOUS VEHICLE, AND METHOD FOR RESPONDING TO DRUNK DRIVING THEREOF

CROSS-REFERENCE TO RELATED APPLICATION

The present application claims priority to Korean Patent Application No. 10-2021-0178098, filed on Dec. 13, 2021, the entire contents of which is incorporated herein for all purposes by this reference.

BACKGROUND OF THE PRESENT DISCLOSURE

Field of the Present Disclosure

The present disclosure relates to an autonomous driving vehicle and a drunk driving responding method, more particularly, to a technique for detecting and responding to a drunk driving situation.

Description of Related Art

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver.

Accordingly, in an autonomous driving mode, the driver may rest or do other work in a comfortable state.

However, even in the autonomous driving mode, there may be a situation in which driver intervention is required depending on an autonomous driving level, and in the case where the driver drinks alcohol, there may be a situation in which the driver becomes drunk and drives when the driver intervenes.

Accordingly, although legislation to restrict drunk driving during autonomous driving is in progress, a strategy to respond to drunk driving is required depending on whether an autonomous driving function is activated or not.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an autonomous driving vehicle and a drunk driving responding method, configured for improving marketability of autonomous driving by disabling an autonomous driving function and prohibiting driving the vehicle when drunk driving of the autonomous vehicle is detected and by ensuring safety of a driver and an occupant by moving the vehicle to a safe zone.

The technical objects of the present disclosure are not limited to the objects mentioned above, and other technical objects not mentioned may be clearly understood by those skilled in the art from the description of the claims.

Various aspects of the present disclosure are directed to providing an autonomous vehicle, including: an autonomous driving control apparatus including a processor that is configured to determine whether the vehicle is in an emergency situation when the alcohol is detected in the vehicle, and to move the vehicle to an operational design domain when the processor concludes that the vehicle is in the emergency situation, and a communication device that is configured to notify a government office or a rescue organization of the emergency situation.

In an exemplary embodiment of the present disclosure, the processor is configured to perform turning off the vehicle and prohibit driving of the vehicle when the vehicle is not in the emergency situation after the alcohol is detected in the vehicle.

In an exemplary embodiment of the present disclosure, the processor when the vehicle is in the emergency situation after the alcohol is detected in the vehicle, may activate a driving assistance function of the vehicle to assist a driver in driving to guide a path that sets the operational design domain as a destination of the vehicle.

In an exemplary embodiment of the present disclosure, the processor may activate an autonomous driving function to set a government office or a rescue organization as a destination of the vehicle and to move the vehicle to the government office or the rescue organization when the vehicle arrives in the operational design domain.

In an exemplary embodiment of the present disclosure, the processor is configured to move the vehicle to the government office or the rescue organization positioned within the operational design domain.

In an exemplary embodiment of the present disclosure, it may further include an interface device configured to display a text asking whether the vehicle is in an emergency situation when the alcohol is detected in the vehicle.

In an exemplary embodiment of the present disclosure, the processor is configured to determine that the vehicle is in the emergency situation when occurrence of the emergency situation is inputted by a driver through the interface device.

In an exemplary embodiment of the present disclosure, the processor is configured to determine that the vehicle is in the emergency situation when a starting button is pressed three times or more than the three times within a predetermined time period or when an emergency button in the vehicle is pressed.

In an exemplary embodiment of the present disclosure, the processor, after the vehicle starts driving because the alcohol is not detected before the vehicle starts driving, may determine whether the alcohol is detected in an interior of the vehicle after the vehicle reaches the operational design domain.

In an exemplary embodiment of the present disclosure, the processor is configured to determine a situation of a surrounding lane and controls the vehicle to stop so that the vehicle does not deviate from the operational design domain when the alcohol is detected in the interior of the vehicle after the vehicle reaches the operational design domain.

In an exemplary embodiment of the present disclosure, the processor is configured to move the vehicle to a lowest lane when a lane change of the vehicle is possible when the alcohol is detected in the interior of the vehicle after the vehicle reaches the operational design domain.

In an exemplary embodiment of the present disclosure, the processor is configured to enable the vehicle to stop in a lane and to wait when a lane change of the vehicle is not possible when the alcohol is detected in the interior of the vehicle after the vehicle reaches the operational design domain.

In an exemplary embodiment of the present disclosure, the processor is configured to transmit drunk driving information to at least one of the government office, a rescue agency, or a manufacturer when the alcohol is detected in the interior of the vehicle after the vehicle reaches the operational design domain.

In an exemplary embodiment of the present disclosure, the processor is configured to output a warning lamp and a warning sound inside the vehicle when a lane change of the vehicle is possible when the alcohol is detected in the interior of the vehicle after the vehicle reaches the operational design domain.

In an exemplary embodiment of the present disclosure, the processor is configured to blink an emergency light to notify surrounding vehicles of a dangerous situation when the alcohol is detected in the interior of the vehicle after the vehicle reaches the operational design domain.

In an exemplary embodiment of the present disclosure, the processor is configured to continue to blink the emergency light and/or to output the warning light and the warning sound until the situation in which the alcohol is detected in the interior of the vehicle is released after the vehicle reaches the operational design domain.

Various aspects of the present disclosure are directed to providing a drunk driving responding method for an autonomous vehicle, including: determining whether the vehicle is in the emergency situation when the alcohol is detected in the vehicle; moving the vehicle to an operational design domain when the vehicle is in the emergency situation; and notifying a government office or a rescue organization of the emergency situation.

In an exemplary embodiment of the present disclosure, it may further include performing turning off the vehicle and prohibiting driving of the vehicle when the vehicle is not in the emergency situation after the alcohol is detected in the vehicle.

In an exemplary embodiment of the present disclosure, it may further include when the vehicle is in the emergency situation after the alcohol is detected in the vehicle, activating a driving assistance function of the vehicle to assist a driver in driving to guide a path which is set in the operational design domain as a destination of the vehicle.

In an exemplary embodiment of the present disclosure, it may further include activating an autonomous driving function of the vehicle, setting a government office or a rescue organization as the destination of the vehicle and moving the vehicle to the government office or the rescue organization when the vehicle arrives in the operational design domain.

According to the present technique, it is possible to improve marketability of autonomous driving by disabling an autonomous driving function and prohibiting driving the vehicle when drunk driving of the autonomous vehicle is detected and by ensuring safety of a driver and an occupant by moving the vehicle to a safe zone.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2 illustrates a view for describing a function for each autonomous driving level of an autonomous vehicle according to various exemplary embodiments of the present disclosure.

Figure 1:
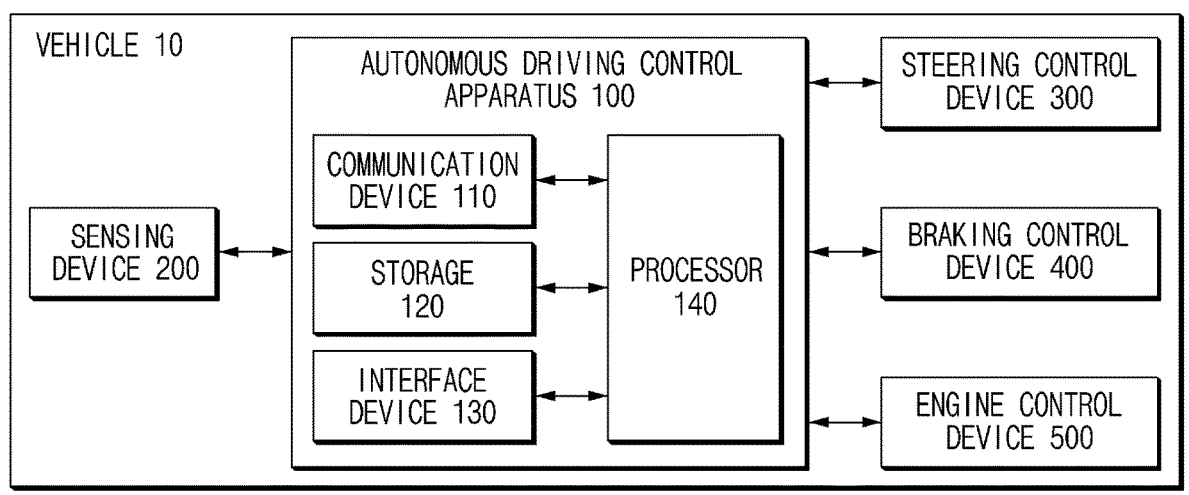
FIG. 1 illustrates a block diagram showing a configuration of an autonomous vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1, FIG. 2, FIG. 3, and FIG. 4.

FIG. 1 illustrates a block diagram showing a configuration of an autonomous vehicle according to various exemplary embodiments of the present disclosure.

Referring to FIG. 1, a vehicle 10 according to various exemplary embodiments of the present disclosure as an autonomous driving vehicle, detects drunk driving in advance and responds to prohibit driving, and in the instant case, may promote safety of a driver and an occupant by controlling the vehicle to move to a safe zone in an emergency situation.

The vehicle 10 may include an autonomous driving control apparatus 100, a sensing device 200, a steering control device 300, a braking control device 400, and an engine control device 500.

The autonomous driving control apparatus 100 according to the exemplary embodiment of the present disclosure may be implemented inside the vehicle. In the instant case, the autonomous driving control apparatus 100 may be integrally formed with internal control units of the vehicle, or may be implemented as a separate device to be connected to control units of the vehicle by a separate connection means.

When alcohol is detected in the vehicle, the autonomous driving control apparatus 100 may determine whether it is an emergency situation, and in the emergency situation, even when alcohol is detected, may move the vehicle to an operational design domain (ODD) to promote the safety of the driver and the occupant. In the instant case, the emergency situation may include intrusion of a gangster into a vehicle, and the like. Furthermore, the operational design domain is a zone where an autonomous driving function is activated, and may include, e.g., a highway, an exclusive road for vehicles, a road with few obstacles, a road with two or more lanes, a straight road, and the like, and may further include an area which is set by a user. In an exemplary embodiment of the present disclosure, an area with a large number of people such as more than a predetermined number of people, an area in which a police station exists, etc. may be set as an ODD, and the vehicle can immediately move to the ODD in an emergency situation such as an attack by a gangster.

Furthermore, the autonomous driving control apparatus 100 may operate five autonomous driving function levels as illustrated in FIG. 2. FIG. 2 illustrates a view for describing a function for each autonomous driving level of an autonomous vehicle according to various exemplary embodiments of the present disclosure. Referring to FIG. 2, the autonomous driving function levels may be divided into Level 0, Level 1, Level 2, Level 3, Level 4, and Level 5. Level 0 indicates a non-automated state, in which a driver always drives. Level 1 indicates a driver assistance state, in which the autonomous driving control apparatus performs steering, deceleration, and acceleration assistance. Level 2 indicates a partially automated state, in which the autonomous driving control apparatus performs steering, deceleration, and acceleration. Level 3 indicates a conditionally automated state, in which the driver intervenes in case of danger during autonomous driving. Level 4 indicates advanced automated state, in which driver intervention is unnecessary during autonomous driving. Level 5 indicates a fully automated state, in which no driver is required.

The present disclosure may be applied to a level that requires driver intervention, such as Level 1, Level 2, Level 3, or Level 4. That is, there may be cases where driver intervention is required during autonomous driving, and in the instant case, a driver must not be under an influence of alcohol, and thus it is possible to detect and respond to a drinking state of the driver.

The autonomous driving control apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include controller area network (CAN) communication, Local Interconnect Network (LIN) communication, flex-ray communication, Ethernet communication, and the like.

Furthermore, the communication device 110 may perform communication by use of a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, Worldwide Interoperability for MicrowaveAccess (WiMAX), Ethernet communication, etc. Furthermore, short-range communication technique may include Bluetooth, ZigBee, ultra wideband (UWB), radio frequency identification (RFID), infrared data association (IrDA), and the like. For example, the communication device 110 may notify an emergency situation to a major public office (e.g., a police station, 119, a police box, etc.), a rescue organization, a manufacturer connected service center, or the like.

The storage 120 may store sensing results of the sensing device 200 and data and/or algorithms required for the processor 140 to operate, and the like.

As an exemplary embodiment of the present disclosure, the storage 120 may store image data of a driver and an occupant image data, a predetermined operational design domain, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the autonomous driving control apparatus 100 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The output means may include a display, and may further include a voice output means such as a speaker. In the instant case, when a touch detector formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

As an exemplary embodiment of the present disclosure, the interface device 130 may be implemented as a head-up display (HUD), a cluster, an audio video navigation (AVN), a human machine interface (HM), a user setting menu (USM), or the like.

For example, the interface device 130 may display a request phrase such as transfer of control authority during autonomous driving, a warning phrase for drunk driving, and the like, and may receive an approval for the transfer of control authority from a driver, etc. To the present end, the interface device 130 may receive the input from the driver through a mouse, a keyboard, a touch screen, a microphone, or the like.

As an exemplary embodiment of the present disclosure, the interface device 130 may display a phrase for confirming an emergency situation. For example, the interface device 130 may display a phrase "Please touch in the emergency situation" and provide input information to the processor 140 when it is touched by the driver.

As an exemplary embodiment of the present disclosure, the interface device 130 may output a drunk driving warning phrase or a warning sound.

The processor 140 may be electrically connected to the communication device 110, the storage 120, the interface device 130, and the like, may electrically control each component, and may be an electrical circuit that executes software commands, performing various data processing and calculations described below.

The processor 140 may process a signal transferred between components of the autonomous driving control apparatus 100, and may perform overall control so that each of the components can perform its function normally.

The processor 140 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

When alcohol is detected in the vehicle, the processor 140 may determine whether it is an emergency situation, and may move the vehicle to an operational design domain (ODD) when it is the emergency situation.

The processor 140 may perform starting off and prohibit driving of the vehicle when it is not an emergency situation after detecting alcohol in the vehicle.

When it is the emergency situation after alcohol is detected in the vehicle, the processor 140 may activate a driving assistance function to assist a driver in driving to guide a path that sets the operational design domain as a destination.

Furthermore, when the vehicle arrives in the operational design domain, the processor 140 may activate an autonomous driving function to set a government office or a rescue organization as a destination to move the vehicle to the government office or the rescue organization.

In the instant case, the processor 140 may move the vehicle to the government office or the rescue organization positioned within the operational design domain.

When occurrence of the emergency situation is inputted by a driver through the interface device 113, the processor 140 may determine that it is the emergency situation.

Furthermore, the processor 140 may determine that it is the emergency situation when a starting button is pressed three times or more than the three times within a predetermined time period or when an emergency button in the vehicle is pressed.

Furthermore, the processor 140 may determine whether alcohol is detected in an interior of the vehicle after the vehicle 10 reaches the operational design domain, after the vehicle starts driving because alcohol is not detected before the vehicle starts driving.

When alcohol is detected in the interior of the vehicle after the vehicle 10 reaches the operational design domain, the processor 140 may determine a situation of a surrounding lane and control the vehicle to stop so that the vehicle does not deviate from the operational design domain.

Furthermore, in the case where alcohol is detected in the interior of the vehicle after the vehicle 10 reaches the operational design domain, the processor 140 may move the vehicle to a lowest lane when a lane change is possible.

In the case where alcohol is detected in the interior of the vehicle after the vehicle 10 reaches the operational design domain, the processor 140 may enable the vehicle to stop in the lane and to wait when the lane change is not possible.

Furthermore, when alcohol is detected in the interior of the vehicle after the vehicle 10 reaches the operational design domain, the processor 140 may transmit the drunk driving information to at least one of a government office, a rescue agency, or a manufacturer connected center.

In the case where alcohol is detected in the interior of the vehicle after the vehicle 10 reaches the operational design domain, the processor 140 may output a warning lamp and a warning sound inside the vehicle when the lane change is possible.

When alcohol is detected in the interior of the vehicle after the vehicle 10 reaches the operational design domain, the processor 140 may blink an emergency light to notify surrounding vehicles of a dangerous situation.

The processor 140 may continue to blink the emergency light and/or to output the warning light and the warning sound until a situation in which alcohol is detected in the interior of the vehicle is released after the vehicle 10 reaches the operational design domain.

The sensing device 200 may detect information related to obstacles (e.g., intrusion of a gangster, etc.) positioned around the vehicle and alcohol of a driver inside the vehicle. The sensing device 200 may include a breathing detection detector, a contact detection detector, a camera, and the like to detect alcohol of a driver in an interior of the vehicle. For example, when a driver holding alcohol (e.g., beer, etc.) inside a vehicle is photographed, it may be determined that alcohol is detected. Furthermore, blood alcohol concentration may be detected through breathing or contact of the driver, and the processor 140 may determine drunk driving when the alcohol concentration transferred from the sensing device 200 is detected to be greater than or equal to a predetermined reference level.

The sensing device 200 may include a plurality of detectors to detect an obstacle such as a gangster approaching the vehicle, and may include an ultrasonic detector, a radar, a camera, a laser scanner and/or a corner radar, a Light Detection and Ranging (LiDAR), an acceleration detector, a yaw rate detector, a torque measurement detector and/or a wheel speed detector, a steering angle detector, and the like.

The steering control device 300 may be configured to control a steering angle of a vehicle, and may include a steering wheel, an actuator interlocked with the steering wheel, and a controller configured for controlling the actuator.

The braking control device 400 may be configured to control braking of the vehicle, and may include a controller that controls a brake thereof.

The engine control device 500 may be configured to control engine driving of a vehicle, and may include a controller that controls a speed of the vehicle.

Figure 3:
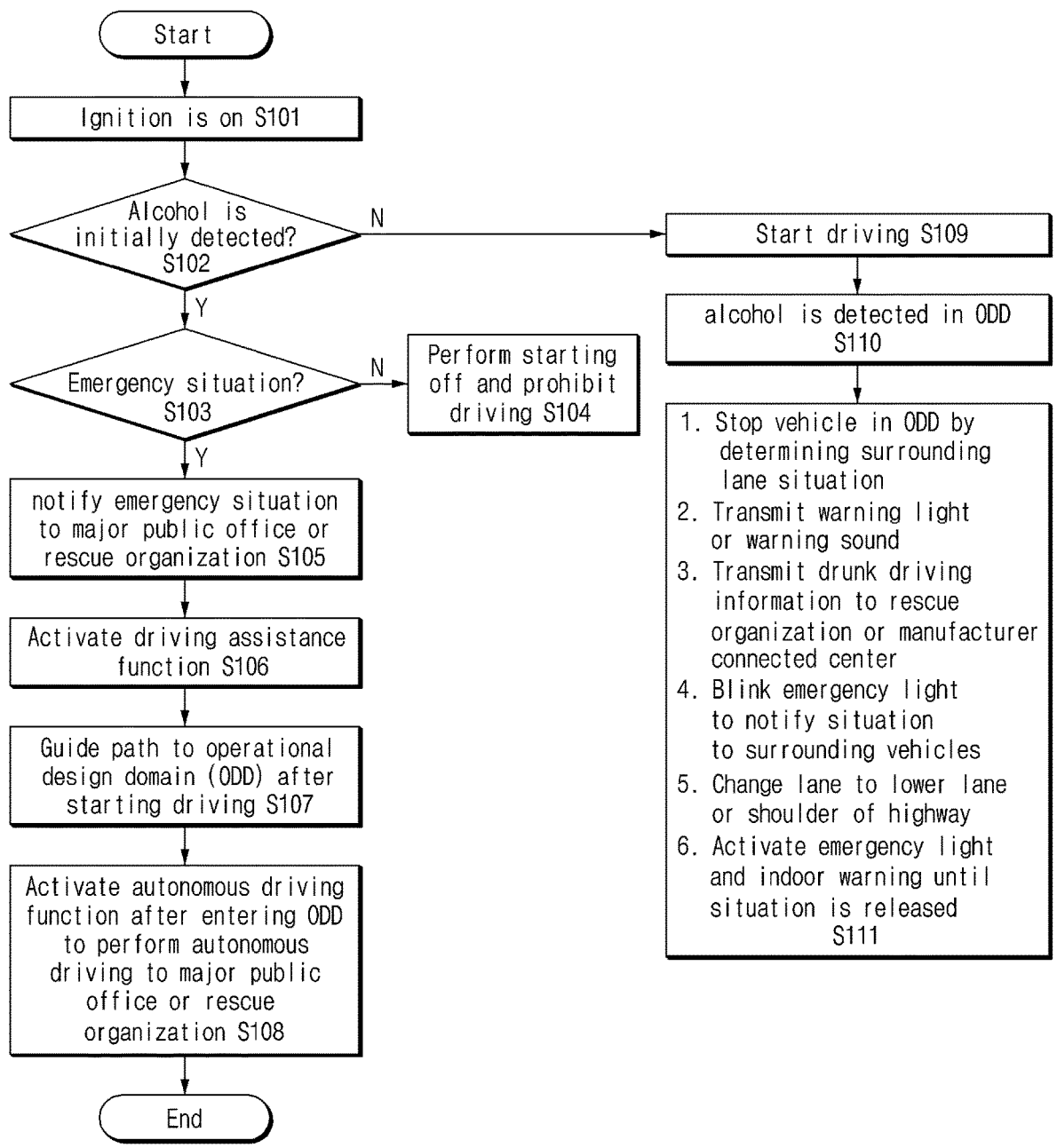
FIG. 3 illustrates a flowchart showing a drunk driving responding method for an autonomous vehicle according to various exemplary embodiments of the present disclosure.

Hereinafter, a drunk driving responding method for an autonomous vehicle according to various exemplary embodiments of the present disclosure will be described in detail with reference to FIG. 4. FIG. 3 illustrates a flowchart showing a drunk driving responding method for an autonomous vehicle according to various exemplary embodiments of the present disclosure.

Hereinafter, it is assumed that the autonomous driving control apparatus 100 of the vehicle 10 illustrated in FIG. 1 performs processes of FIG. 3. Furthermore, in the description of FIG. 3, it may be understood that operations referred to as being performed by each system are controlled by a processor of each of the devices.

Referring to FIG. 3, after ignition is turned on (S101), the autonomous driving control apparatus 100 determines whether alcohol is initially detected (S102). In the instant case, FIG. 3 includes an example of detecting alcohol in a vehicle after the ignition is turned on, but the present disclosure is not limited thereto, and alcohol may be detected in the vehicle after on or off of a vehicle door is detected before starting the vehicle.

When the alcohol is first detected, the autonomous driving control apparatus 100 may determine whether it is an emergency situation (S103). The autonomous driving control apparatus 100 outputs "Touch in case of an emergency" to the interface device 113, and when touched by the driver, may determine that it is an emergency situation. Furthermore, the autonomous driving control apparatus 100 may determine that it is an emergency situation when a start button is briefly pressed three or more times or an emergency button such as an e-call is pressed. In the instant case, the emergency situation may include an attack by a gangster, such as a gun robbery.

Furthermore, the autonomous driving control apparatus 100 may determine an emergency situation through image data of, e.g., a camera that captures the outside of the vehicle.

When it is not an emergency situation after the first alcohol detection, the autonomous driving control apparatus 100 turns off an engine and prohibits driving (S104).

On the other hand, when it is an emergency situation after the first alcohol detection, the autonomous driving control apparatus 100 may control it to be driven to escape the emergency situation even though alcohol is detected.

First, the autonomous driving control apparatus 100 may notify an emergency situation to a major public office (e.g., a police station, 119, a police box, etc.), a rescue organization, a manufacturer connected service center, or the like (S105). Thereafter, the autonomous driving control apparatus 100 may periodically communicate with the major public office, the rescue organization, the manufacturer connected service center, or the like to receive advice on an emergency situation until the vehicle 10 arrives at the major public office, the rescue organization, the manufacturer connected service center, or the like.

Accordingly, the autonomous driving control apparatus 100 activates a driving assistance function (S106), starts driving, guides a path to an operational design domain (ODD), and moves the vehicle to the ODD (S107). In the instant case, the driving assistance function refers to a function of assisting a driver in driving while the driver has control authority. The driving assistance function may be applied to a highway driving assist (HDA), a lane following assist (LFA), a smart cruise control (SCC), an advanced smart cruise control (ASCC) system, an advanced driver assistance system (ADAS), a remote smart parking assist (RSPS), a lane departure warning system (LDWS), a lane keeping assist system (LKAS), a blind spot detection (BSD) system, a forward collision warning system (FCWS), a driver drowsiness detection system, a pedestrian detection (PD) system, a traffic sign recognition (TSR) system, a blind-spot view monitoring (BVM) system, a traffic jam Assist (TJA) system, and the like.

Furthermore, the ODD is a zone where an autonomous driving function is activated, and may include, e.g., a highway, an exclusive road for vehicles, a road with two or more lanes, and the like, and may further include all areas in which autonomous driving is possible.

The autonomous driving control apparatus 100 may guide the vehicle to move to a nearest ODD rather than a destination, and may guide a path based on a road with good lane recognition and driving circumstances.

The autonomous driving control apparatus 100 activates the autonomous driving function after entering the ODD to perform autonomous driving control so that the vehicle moves to a major government office or a rescue organization (S108). In the instant case, the main public office or the rescue organization may be limited to a major public office or a rescue organization positioned within the ODD. Furthermore, the autonomous driving control apparatus 100 may automatically set a major government office or a rescue organization as a destination to perform driving control.

Accordingly, according to an exemplary embodiment of the present disclosure, even when alcohol is detected in the vehicle before driving, it may be determined whether there is an emergency without unconditionally turning off the engine, and when it is an emergency situation, the vehicle may be allowed to move to avoid the emergency situation, ensuring safety of a driver and an occupant.

On the other hand, when the alcohol is not initially detected in the step S102, the vehicle 10 starts driving (S109). Thereafter, the autonomous driving control apparatus 100 may periodically perform alcohol detection while vehicle 10 is driving.

In the instant case, when alcohol is detected in an interior of the vehicle after reaching the ODD (S110), the autonomous driving control apparatus 100 performs a drunk driving responding logic (S111). For example, this is a case in which a driver drinks alcohol from a time when the autonomous driving function is activated after entering the ODD such as a highway. That is, it is an example of a case of drinking a small amount of alcohol as soon as it enters the highway because it is a four-hour drive on the highway.

That is, the autonomous driving control apparatus 100 determines a surrounding lane situation, and stops the vehicle 10 in the ODD so that the vehicle 10 does not deviate from the ODD.

Furthermore, the autonomous driving control apparatus 100 may transmit a warning light and a warning sound through a cluster or the like to warn the driver about drunk driving.

Furthermore, the autonomous driving control apparatus 100 may perform communication by immediately transmitting drunk driving information to a major government office, a rescue organization, or a manufacturer connected center.

Furthermore, the autonomous driving control apparatus 100 may blink an emergency light to enable surrounding vehicles to recognize that they are in an abnormal situation, such as drunk driving of the host vehicle, to induce defensive driving.

Besides, the autonomous driving control apparatus 100 may determine whether the vehicle 10 may change a lane to a lower lane or a shoulder of a highway, and may move the vehicle 10 to a lowermost lane when the lane change is possible. When the lane change is impossible, the autonomous driving control apparatus 100 may control it to wait after stopping in the lane.

Furthermore, the autonomous driving control apparatus 100 may activate an emergency light and an indoor warning (warning lamp and warning sound) until the drunk driving situation is released.

Accordingly, according to an exemplary embodiment of the present disclosure, it is possible to actively respond to a drunk driver of an autonomous vehicle, even when alcohol is detected in the vehicle, it may be determined that it is an emergency situation, and when it is the emergency situation, it is possible to control the vehicle to avoid the emergency situation and moves to a safe zone, further ensuring safety of a driver and an occupant.

Figure 4:
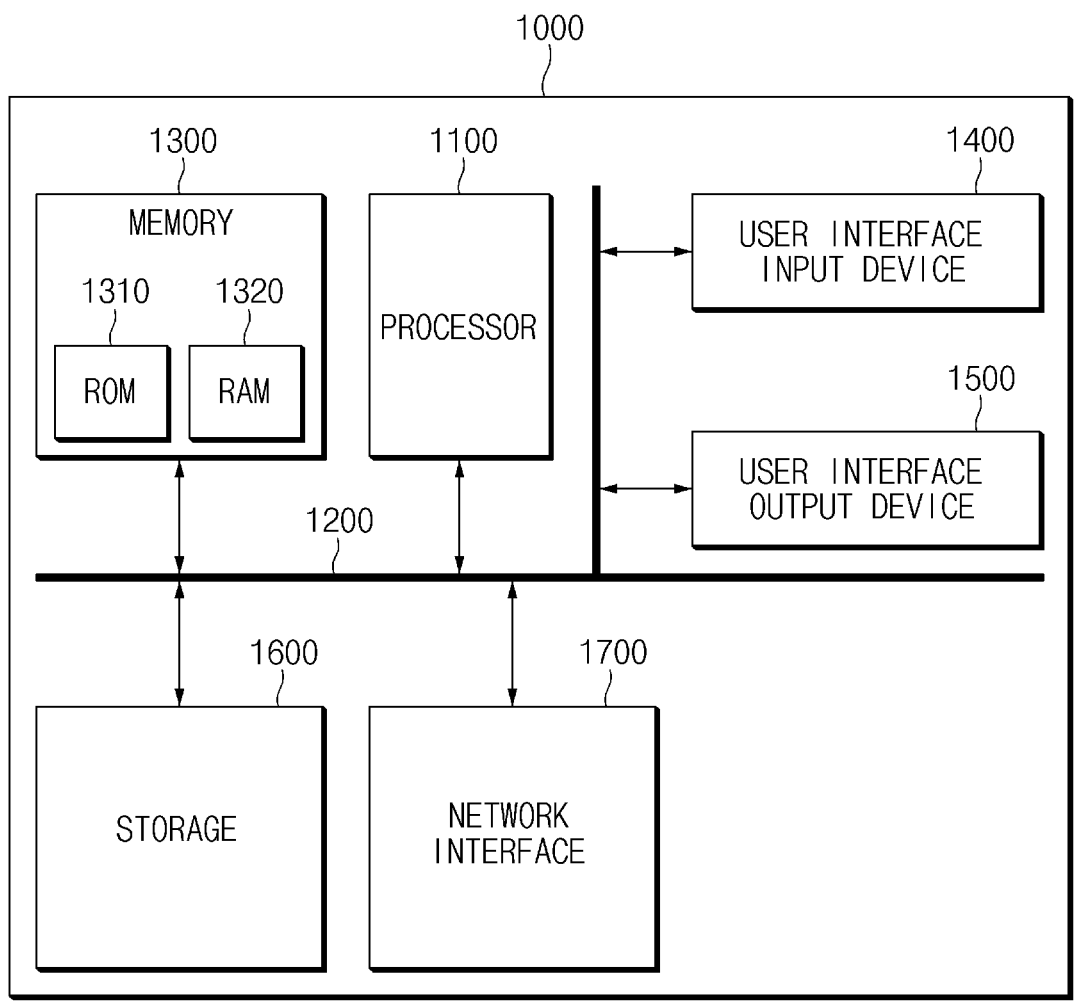
FIG. 4 illustrates a computing system according to various exemplary embodiments of the present disclosure.

FIG. 4 illustrates a computing system according to various exemplary embodiments of the present disclosure.

Referring to FIG. 4, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous vehicle, comprising:
   an autonomous driving control apparatus including a processor configured to determine whether the vehicle is in an emergency situation when alcohol is detected in the vehicle, and configured to move the vehicle to an operational design domain when the processor concludes that the vehicle is in the emergency situation, and
   a communication device that is configured to notify a government office or a rescue organization of the emergency situation,
   wherein the processor is configured to perform turning off the vehicle and to prohibit driving of the vehicle when the vehicle is not in the emergency situation after the alcohol is detected in the vehicle.

2. The autonomous vehicle of claim 1, wherein when the vehicle is in the emergency situation after the alcohol is detected in the vehicle, the processor is configured to activate a driving assistance function of the vehicle to assist a driver in driving to guide a path that sets the operational design domain as a destination of the vehicle.

3. The autonomous vehicle of claim 2, wherein the processor is configured to activate an autonomous driving function of the vehicle to set the government office or the rescue organization as the destination of the vehicle and to move the vehicle to the government office or the rescue organization when the vehicle arrives in the operational design domain.

4. The autonomous vehicle of claim 3, wherein the processor is configured to move the vehicle to the government office or the rescue organization positioned within the operational design domain.

5. The autonomous vehicle of claim 1, further including:
   an interface device configured to display a text asking whether the vehicle is in the emergency situation when the alcohol is detected in the vehicle.

6. The autonomous vehicle of claim 5, wherein the processor is configured to determine that the vehicle is in the emergency situation when occurrence of the emergency situation is inputted to the processor by a driver through the interface device.

7. The autonomous vehicle of claim 1, wherein the processor is configured to determine that the vehicle is in the emergency situation when a starting button is pressed three times or more than the three times within a predetermined time period or when an emergency button in the vehicle is pressed.

8. The autonomous vehicle of claim 1, wherein after the vehicle starts driving because the alcohol is not detected before the vehicle starts driving, the processor is configured to determine whether the alcohol is detected in an interior of the vehicle after the vehicle reaches the operational design domain.

9. The autonomous vehicle of claim 8, wherein the processor is configured to determine a situation of a surrounding lane and to control the vehicle to stop so that the vehicle does not deviate from the operational design domain when the alcohol is detected in the interior of the vehicle after the vehicle reaches the operational design domain.

10. The autonomous vehicle of claim 8, wherein the processor is configured to move the vehicle to a lowest lane when a lane change of the vehicle is possible when the alcohol is detected in the interior of the vehicle after the vehicle reaches the operational design domain.

11. The autonomous vehicle of claim 8, wherein the processor is configured to enable the vehicle to stop in a lane and to wait when a lane change of the vehicle is not possible when the alcohol is detected in the interior of the vehicle after the vehicle reaches the operational design domain.

12. The autonomous vehicle of claim 8, wherein the processor is configured to transmit drunk driving information to at least one of the government office, a rescue agency, or a manufacturer when the alcohol is detected in the interior of the vehicle after the vehicle reaches the operational design domain.

13. The autonomous vehicle of claim 8, wherein the processor is configured to output a warning lamp and a warning sound inside the vehicle when a lane change of the vehicle is possible when the alcohol is detected in the interior of the vehicle after the vehicle reaches the operational design domain.

14. The autonomous vehicle of claim 13, wherein the processor is configured to blink an emergency light to notify surrounding vehicles of a situation of the vehicle when the alcohol is detected in the interior of the vehicle after the vehicle reaches the operational design domain.

15. The autonomous vehicle of claim 14, wherein the processor is configured to continue to blink the emergency light or to output the warning light and the warning sound until the situation in which the alcohol is detected in the interior of the vehicle is released after the vehicle reaches the operational design domain.

16. A drunk driving responding method including:
determining, by a processor, whether an autonomous vehicle is in an emergency situation when alcohol is detected in the vehicle;
moving, by the processor, the vehicle to an operational design domain when the vehicle is in the emergency situation;
notifying, by the processor, a government office or a rescue organization of the emergency situation; and
performing, by the processor, turning off the vehicle and prohibiting, by the processor, driving of the vehicle when the vehicle is not in the emergency situation after the alcohol is detected in the vehicle.

17. The drunk driving responding method of claim 16, further including:
when the vehicle is in the emergency situation after the alcohol is detected in the vehicle,
activating, by the processor, a driving assistance function of the vehicle to assist a driver in driving to guide a path that sets the operational design domain as a destination of the vehicle.

18. The drunk driving responding method of claim 17, further including:
activating an autonomous driving function of the vehicle, setting the government office or the rescue organization as the destination of the vehicle and moving the vehicle to the government office or the rescue organization when the vehicle arrives in the operational design domain.

* * * * *